United States Patent
Fliedner et al.

(10) Patent No.: US 7,994,243 B2
(45) Date of Patent: Aug. 9, 2011

(54) STABLE AQUEOUS NOVOLAC DISPERSION

(75) Inventors: Elke Fliedner, Berlin (DE); Marc Cornick, Berlin (DE); Hendrikus W. G. Van Herwijnen, Hausleiten-Goldgeben (AT)

(73) Assignee: Dynea Oy, Helsinki (FI)

( * ) Notice: Subject to any disclaimer, the term of this patent is extended or adjusted under 35 U.S.C. 154(b) by 953 days.

(21) Appl. No.: 11/834,866

(22) Filed: Aug. 7, 2007

(65) Prior Publication Data

US 2009/0017709 A1    Jan. 15, 2009

Related U.S. Application Data

(60) Provisional application No. 60/835,879, filed on Aug. 7, 2006.

(51) Int. Cl.
*C08L 3/00* (2006.01)
*C08L 5/00* (2006.01)
*C08L 61/00* (2006.01)
*B32B 5/02* (2006.01)
*B32B 15/02* (2006.01)

(52) U.S. Cl. ........ 524/47; 524/27; 524/18; 524/55; 524/386; 442/59; 428/402

(58) Field of Classification Search ........ 524/27, 524/18, 47, 386; 428/402–407
See application file for complete search history.

(56) References Cited

U.S. PATENT DOCUMENTS

| | | | |
|---|---|---|---|
| 3,843,576 A * | 10/1974 | Parkinson | ........ 524/510 |
| 4,124,554 A | 11/1978 | Fry | |
| 4,167,500 A | 9/1979 | Jazenski et al. | |
| 4,788,236 A * | 11/1988 | Kopf | ........ 524/55 |
| 4,812,445 A | 3/1989 | Eden et al. | |
| 5,200,455 A | 4/1993 | Warren | |
| 5,670,571 A | 9/1997 | Gabrielson et al. | |
| 6,130,289 A | 10/2000 | Kucera | |
| 7,247,683 B2 * | 7/2007 | Hurley et al. | ........ 525/481 |
| 2007/0191575 A1 * | 8/2007 | Sumner et al. | ........ 528/137 |

FOREIGN PATENT DOCUMENTS

| | | |
|---|---|---|
| CA | 2303870 | 3/1999 |
| CA | 2296597 A1 | 7/2000 |
| EP | 0 084 681 A1 | 8/1983 |
| EP | 0 217 587 A2 | 4/1987 |
| EP | 1 022 370 A2 | 7/2000 |
| GB | 899776 | 6/1962 |
| GB | 1 597 263 | 9/1981 |
| JP | 55-152897 A | 11/1980 |
| WO | WO-96/33309 A1 | 10/1996 |
| WO | WO-99/14022 A1 | 3/1999 |
| WO | WO-99/25207 A1 | 5/1999 |
| WO | WO-2007/071387 A2 | 6/2007 |

OTHER PUBLICATIONS

A. Knop et al., Phenolic Resins, Springer Verlag, 1985, Chapter 3 (pp. 24-61) "Reaction Mechanisms" and Chapter 5 (pp. 91-102) "Resin Production."

* cited by examiner

*Primary Examiner* — D. Lawrence Tarazano
*Assistant Examiner* — Ricardo E Lopez
(74) *Attorney, Agent, or Firm* — Birch, Stewart, Kolasch & Birch, LLP (57) ABSTRACT

An aqueous composition including a particulate novolac resin and a polyol, wherein >50% of the number of total particles of novolac resin have a particle size of >15 μm and >5% of the number of total particles of novolac resin have a particle size of >50 μm, wherein the particulate novolac resin has a dropping point temperature of >127° C., and wherein the aqueous composition is essentially free of organic solvent. The aqueous composition will form a stable dispersion which is ideal for the preparation of a film or coating of substrates such as fiberglass, nonwoven fibers, or lignocellulosic materials which include composite boards, plywoods, parquets, laminated veneer lumber (LVL), laminated flooring, doors, wood for door frames and paper.

25 Claims, 1 Drawing Sheet

Fresh Dispersion

Fig.1

Dispersion after 6 days

Fig.2

STABLE AQUEOUS NOVOLAC DISPERSION

TECHNICAL FIELD OF THE INVENTION

Novel aqueous composition comprising novolac resins and polyols and their method of preparation and method of use.

BACKGROUND OF THE INVENTION

Phenolic resins made from phenol (P) and formaldehyde (F) include resoles and novolacs. Resoles have a F/P ratio of greater than 1. As such, resoles have the disadvantage that they contain free formaldehyde. This is in distinction to novolacs which have a F/P ratio of less than 1. As such, novolacs have a deficit of formaldehyde and, therefore, can also serve as formaldehyde scavengers. Novolacs can be used in their cured (or thermoset) state, but they can also be applied in an uncured, thermoplastic state (see WO2007/071387A2 (Dynea Erkner GmbH)).

At ambient conditions, the latter state is typically solid, and they can be described as glassy/congealed or amorphous solid materials. Upon temperature increase, the material consistency becomes softer and beyond the melting range becomes a liquid.

The manufacturing of novolacs is well known to a person skilled in the art, as may be found in A. Knop & L. A. Pilato, Phenolic Resins, Springer Verlag, 1985, Chapters 3 & 5.

Sometimes, it might be preferred to apply a novolac in a liquid form at around room temperature. A first approach (GB 899,776) dissolves novolacs in hydroxides of alkalines or earth alkalines. After drying or curing, the hydroxides remain on the surface, thereby increasing the pH to values, which are often undesirable.

In a second approach, novolacs can be dissolved in liquid resoles. However, as resoles exhibit a kinetically controlled self-curing process, they only have a limited storage stability, which then also limits the storage stability of the novolac-resole solutions.

In yet a further approach, novolacs can be dissolved in an organic solvent, such as described in U.S. Pat. No. 4,124,554, U.S. Pat. No. 5,200,455 or U.S. Pat. No. 4,167,500, disclosing the use of organic solvents to produce aqueous dispersions of novolacs. The use of such solvents is often unwanted, because they are often flammable and/or hazardous for the environment.

Whilst water would not have these disadvantages, novolacs do not dissolve therein and are not miscible therewith.

U.S. Pat. No. 5,670,571 (Georgia Pacific Resins) describes a method to produce an aqueous dispersion of a novolac resin and its use as a binder system for thermal insulation. Hereby, the water is added to the molten novolac and, therefore, this method is limited to novolacs having a melting point below 100° C. The process further employs surfactants (e.g. lecithin) and protective colloids (e.g. casein or polysaccharides sugar, or guar gum). Furthermore, the method of U.S. Pat. No. 5,670,571 produces only novolac particle sizes of 0.1-20 μm.

U.S. Pat. No. 6,130,289 (Lord Corporation) describes an aqueous dispersion of phenolic resins of the resole or novolac type. Dispersed within the aqueous phase is the reaction product of a phenolic resin precursor and a modifying agent wherein the modifying agent includes at least one ionic group and at least one functional moiety that enables the modifying agent to undergo condensation with the phenolic resin precursor. The modifying agent contains at least two distinct functional groups wherein one of the at least two functional groups is an ionic pendant group and another of the at least two functional groups is capable of reacting with a phenolic resin precursor.

Whilst the disclosures of the above documents relate to in-situ formed resins, U.S. Pat. No. 4,124,554 (Union Carbide Corporation) describes post-formed aqueous phenolic resin dispersions, i.e. to the dispersing of resins after these have been produced into particles. This invention uses polyvinyl alcohol (PVOH) to disperse reacted resins. To this end, a water miscible organic coupling solvent is needed in an amount from about 15 to about 30 percent. In contrast, the present invention does not need an organic solvent.

EP 0084681 (Union Carbide Corporation) describes a process for producing particulate novolacs by acid condensation with sulphur-containing catalysts or mixtures of them with following addition of water and neutralization. In order to achieve particulate novolac resin formation, up to 5% of particular protective colloids are added. The particles can be isolated by conventional means, and may result in mean particle sizes of up to 1 mm. Alternatively, the protective colloid can be used to form an aqueous dispersion of small resin particles (max. 50 μm). Suitable protective colloids are polysaccharides, whilst hydrolyzed PVOH or carboxymethyl cellulose (CMC) was reported to be unsuitable. The resins according to EP 0084681 may be cured by curing agents.

The use of starches in the process of encapsulating materials such as foods are described in, e.g., U.S. Pat. No. 4,812,445 (Nat Starch Chem Corporation) and WO99/25207 (Danisco), however, neither of these references suggest encapsulating novolac resins.

Despite the foregoing, there remains a need for a relatively inexpensive stable aqueous composition (such as a dispersion) of particulate novolac resins which can be applied as a film or coating to a substrate (such as fiberglass, agricultural/horticultural products, and lignocellulosic materials which include composite board, plywood, parquet, laminated veneer lumber (LVL), laminated flooring, door, wood for door frame and paper). An objective of the present invention is to fill this need.

SUMMARY OF THE INVENTION

The present invention, in part, is drawn to an aqueous composition comprising a particulate novolac resin and a polyol, wherein >50% of the number of total particles of novolac resin have a particle size of >15 μm and >5% of the number of total particles of novolac resin have a particle size of >50 μm, wherein the particulate novolac resin has a dropping point temperature of >127° C., and wherein the aqueous composition is essentially free of organic solvent. Ideally, the aqueous composition is in the form of a stable dispersion. The present invention includes a method for preparing the aqueous composition by combining a polyol, novolac resin particles and water, in any order.

The present invention, in part, is drawn to a film, coating or binder formed by applying the aqueous composition to a substrate and removing the aqueous solvent. The inventive composition has the added advantage that it can be used to scavenge formaldehyde.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE INVENTION

An aspect of the invention is an aqueous composition comprising a particulate novolac resin comprising particles of more than about 50 μm and exhibiting a high dropping point temperature (as measured by DIN ISO 2176) and a polyol. The aqueous composition can be in the form of a stable dispersion of particulate novolac resins which can then be applied as a film or coating to a substrate.

The stability of the dispersion is a factor to be considered when tailoring the dispersion to be ideal for particular end use(s). The stability can be controlled by choosing the properties of the solid particulate phase as well as the continuous phase. Thus, present invention includes controlling of the properties of the novolac resin and the properties of the polyol along and the methods in which the ingredients of the dispersion are combined. The properties of the novolac resin which were found to be most clearly connected to the stability/instability of the dispersion are measured in a single measurement known as the dropping point temperature.

The dropping point is the temperature, at which a first drop of molten sample (novolac resin) falls out of the nipple (2.8 mm diameter) of a small cup that contains the examined sample and which is slowly heated up. To determine this parameter, the FP 900 thermo system equipped with the FP 83HT dropping point cell, both of Mettler Toledo, were used.

It was found that the dropping point temperature measurement is most helpful in identifying suitable novolac resins, since this measurement accounts for a variety of characteristics of the novolac resins, including melting point, molecular weight, intra- and intermolecular interactions, etc. Preferably, the dropping point temperature is greater than 127° C., more preferably is greater than 130° C., most preferably is more than 133° C.

The stability of the dispersion is determined by measuring the time after formation of the dispersion in a clear container until at least one layer containing a single phase is formed and can be seen (visually). The container containing the dispersion is kept under ambient conditions during the test. As mentioned above, the stability of the dispersion can be tailored depending upon the intended use. The dispersion can be tailored to exhibit at least a mid term stability of at least 5 hours and as such can be prepared soon before application to the substrate. In addition, the dispersion can be tailored to have a long term stability of at least 3 weeks, and as such is suitable for preparation long before application to the substrate. Moreover, it was found that if the inventive composition destabilizes and a single phase layer separates out, the dispersion can in most cases be rejuvenated upon shaking which effectively "restarts the clock" and the dispersion will show essentially the same stability as when freshly made.

It was found that novolac particles exhibit varying densities. Such varying densities may be the result of the manufacturing process, but may also be due to changes that a particle may undergo, e.g. by moisture pick up during aging. Thus, the hygroscopicity of the novolacs can be used to advantage by varying the density of the novolac particles and thus, can be used in existing but also novel applications.

It is preferred that the novolac particles remain in the solid state in the aqueous dispersion. The novolac resins are not soluble in water but are soluble/slightly soluble in certain organic solvents. As such, the aqueous dispersion is essentially free of organic solvent (i.e., contains less than an amount of organic solvent which would adversely affect the properties of the stable dispersion so that the stable dispersion could not be commercially used to prepare a film or coating). Preferably, there is less than 0.01 wt % organic solvent based on the weight of the dispersion.

Without wishing to be bound by the theory, it is believed, that the modifications of the properties of the continuous phase (especially density and viscosity) with the properties of the polyol is particularly effective in overcoming the difficulties of maintaining the particles in the dispersion without settling (forming a layer having a single phase).

Novolacs

Generally, the present invention aims at dispersing solid novolac particles, i.e., novolacs exhibiting a glass transition temperature of well above room temperature. Preferably, the novolac particles exhibit a high melt temperature range of more than 100° C., preferably of more than 110° C. Preferably, the novolac particles exhibit a low flow distance (when measured according to the Flow Distance Method as described herein below). More preferably, the flow distance is less than 45 mm, even more preferably, less than 30 mm, and even more preferably, less than 24 mm, and most preferably, less than 20 mm. Suitable novolac particles contain resins having a weight average molecular weight (Mw) of greater than 3,800 daltons, more preferably, greater than 4,000 daltons and most preferably 4,500-10,000 daltons.

Examples of such suitable resins, which are all commercially available from Dynea Oy, are shown in Table 1 below. Table 1 gives measurements of properties of individual batches of novolac resins (and these properties will vary somewhat from batch to batch).

TABLE 1

| Novolac | Molecular weight $M_w$ | Flow dist. [mm] | Dropping point [° C.] |
|---|---|---|---|
| Prefere 888766R | 6393 | 20 | 136.0 |
| Prefere 824118D | 9215 | 17.5 | 142.3 |
| EXP 5E 8851 | 5432 | 24 | 134.2 |
| Prefere 824440X | 4651 | 30 | 133.1 |
| Prefere 824439X | 3737 | 46 | 126.2* |
| Prefere 824441X | — | 49 | 123.8* |
| Prefere 824439X | 3379 | 55 | 123.7* |
| Prefere 824441X | — | 73 | 117.8* |
| Prefere 824442X | 1982 | 110 | 105.8* |

*comparative batches of novolacs having a dropping point temperature outside the inventive range The novolac content of the dispersion may vary over a wide range, and a preset value may be determined by the future use of the dispersion. Typically, the dispersion will comprise greater than 1 wt % and may comprise as much novolac as possible for maintaining a dispersion, still having an aqueous liquid continuous phase. Typically up to 50 wt % (of the total weight of the dispersion) may be suitable.

The novolac resin can include comonomers along with P and F, so long as the surface properties of the particle do not change to an extent that the particles will give an unwanted reduction in stability to the dispersions (i.e., make them unsuitable for their intended purpose). It is preferred that the novolac resins are made solely with P and F and no other comonomers. These resins made solely with P and F show an increase in dropping point temperature with increased molecular weights. Nonpreferred examples of comonomers which may be excluded from the present invention are nonylphenol, paraffin oil, sunflower oil, castor oil, silicone oil, wood oil, wax and stearate.

Ideally, the novolac resins contain only low amounts of free phenol. Preferably, the novolac resins contain less than about 5 wt %, more preferably less than 1 wt %, and most preferably of less than 0.5 wt % phenol based on the weight of the resin.

Preferably, the novolac resins are moderately hydrophilic, i.e., they exhibit a contact angle (advancing) with water of between about 50° and 60° when measured according to the contact angle measurement method as described herein below.

The novolac resins can be used in a fully cured or partially cured state. In a preferred embodiment, the novolac resins are not fully cured and as such, can act as formaldehyde scavengers.

A particular advantage of the present invention is the ability to maintain stable dispersions of rather typical industrially available novolacs such as ground novolacs and is thus not limited to very small novolac particles, or to very narrow particle size distributions. Typically, the novolac particles exhibit relatively large particle sizes. Preferably, >50% of the number of total particles have a particle size of >15 µm, more preferably, >50% of the number of total particles have a particle size of >20 µm. Preferably, >5% of the number of total particles have a particle size of >50 µm, more preferably, >9% of the number of total particles have a particle size of >50 µm. Particle sizes up to about 1.0 mm can be used.

It should be noted, that these particle sizes are a measure of essentially dry particles, before these have been in extended contact with water or moisture. Upon such contact, novolacs typically embed water molecules within their polymer network, thereby showing a certain degree of swelling, which may be described even by forming a gelly state, coinciding with a change of characteristic properties, including density and hydrophilicity.

It is not unusual for novolac resins, that their moisture content increases upon contact with water or humid air from well below 2 wt % for "fresh" novolac to 6% or more after contact. Also, they tend to form agglomerates, which might make it difficult to perform the particle size determination of the primary, unagglomerated particles. However, if necessary, the particle size of the particles in an aqueous solution can be suitably determined by using conventional optical methods when the novolac resins have been freshly mixed in the aqueous solution.

Polyols

The present invention is directed to maintain such suitable novolac particles in a stable aqueous dispersion. This is achieved by adding a polyol to the aqueous continuous phase preferably before the novolac particles are added. Polyols have been found to be particularly effective in stabilizing the dispersion. The term "polyol" in the present invention is used to describe a molecule or polymer having more than one hydroxyl group.

An important requirement for the polyol is the absence of interactions such as chemical reactions with and/or dissolution of the novolac resin. Thus, for example, glycerol, which dissolves the novolac resin, is not preferred.

The polyol has the advantage that it can be made from renewable carbohydrate raw materials. These include oligosaccharides and polysaccharides such as native starch derived from various plants (legumes, potatoes, corn, wheat etc), low molecular weight carbohydrates (such as monosaccharides and disaccharides); alginic acid, agar agar, carrageen, tragacanth, gum arabic, guar gum, xanthan, karaya, maltodextrin, cationic corn (maize) dextrin, tara gum, pectin, locust bean gum, and the like. When the polyol is derived from various plants such as wheat, corn and potato, the polyol does not have to be isolated prior to use in the aqueous composition, i.e., crude starch-containing products can be used containing residues of proteins, polypeptides, lipids, etc. Crude starch-containing products can be, for example, glutenin or commercially available wheat flour (German type 405, definition according to DIN 10355) which is mostly carbohydrates but also contains about 10 wt % protein.

Natural starches have approximately 20-30% of the starch in the amylose form (having coiled chains of glucose residues) with the balance of starch being amylopectin (having branched chains of glucose residues). Some starches can reach as high as 70% amylose (such as HYLON VII®, National Starch Food Innovation) while others are essentially 100% amylopectin, such as waxy cornstarch, waxy potato starch, etc., It is preferred to use a starch having greater than 80% amylopectin which is assumed to have an increased ability of the branched chains of glucose residues to wrap around (physically entangle) the novolac particles. Most preferred is to use a waxy starch having essentially almost 100% amylopectin (i.e., >95 wt % or even >98 wt % amylopectin based on the total starch weight). These polyols which act to physically entangle the novolac particles act as a protective colloid. Also, amylose chains might retrogradate, i.e., crystallization due to the formation of hydrogen bonds, which might destabilize the dispersion.

The low molecular weight (i.e., less than 1,000 daltons) carbohydrates, such as mono- and disaccharides such as galactose, sucrose, lactose, dextrin, glucose and fructose can be used to advantage. This type of polyols has a significant effect on the stability of the dispersion by modifying the density of the continuous aqueous phase as discussed in further detail below.

Microbiologically produced oligosaccharides and polysaccharides can also be used, such as LEVAN® (a high molecular weight water soluble polymer of fructose, from Montana Polysaccharides Corp.)

Several insoluble renewable raw materials can also be used, such as cellulose, glycogen, pullulan (derived from e.g. *Aerobasidium pullulans*), laminarin (from seaweed species), lichenin (lichens and mosses), chitin, chitosane, guar gum, inulin and the like. The polymeric carbohydrates range in their relative solubility in aqueous solutions.

In the event that the carbohydrate is so insoluble as to make it impractical to prepare dispersion solutions, the solubility can be increased by solubilizing the carbohydrate in a hydrolysis reaction using acidic, oxidative, thermal, or enzymatic means. The type of enzyme to hydrolyyze the carbohydrate can be any known in the art, and is preferably pullanase (α-dextrin endo-1,6-α-glucosidase) and/or α-amylase (1,4-α-D-glucan-4-glucanohydrolase). It is preferred to solubilize the insoluble carbohydrate with a hydrolysis promoting acid. For this procedure, an organic or inorganic acid can be used. It is envisioned that the hydrolysis promoting acid is any strong acid, but is preferably HCl, $H_2SO_4$, HBr, $H_3PO_4$, HF, $HNO_3$ and $HClO_4$. It is most preferred to use HCl. The concentration of the hydrolysis promoting acid is 0.4 to 6.0 N. Preferably, the concentration is 0.5 to 4.5 N. Most preferably, the concentration is 0.5 to 3.0 N.

Without wishing to be bound by the theory, the present invention relies on two basic dispersion mechanisms.

Thus, in one aspect of the present invention, the properties of the continuous phase (especially density and viscosity) are modified, such as by reducing the density differences between the particles and the continuous phase. However, even if the densities of the continuous phase and the particles are exactly matched, this might not result in a stable dispersion, not only because of the particle-to-particle variation of density, but also, among possible further effects, because of possible moisture pick up of the particle (either from the ambient air before being added, or once it has been immersed in the continuous aqueous phase), thereby changing its density and thusly disturbing the equilibrium. An increase in viscosity of the continuous phase can, theoretically, slow down the settling (or raising) velocity. However, these velocities may be reduced to a rate, which can be considered as being stable for the application of the dispersions according to the present invention. Within the present context, there is no particular requirement for the flow regime of the particle, i.e., the settling of the particles can show Newtonian, or non-Newtonian behavior, such as shear thinning, or shear-thickening (dilatant), or thixotropic or rheopectic, or viscoelastic behavior.

Further, in a second aspect of the present invention, it has been found that certain polyols are effective as dispersion stabilizers by modifying more than the density and/or viscosity. Such polyols are also known as protective colloids, as these are thought to be attached (with covalent bond, ionic bond or by Van der Waals bond) with one end of their molecule to the particle, whilst another end of the molecule extends into the continuous phase.

The amount of the polyol may vary significantly for various systems. Generally, the amount is not critical as long as the desired effect of stabilizing the dispersion is achieved and a sufficient amount of novolac is dispersed. Thus, polyols which have high molecular weights, such as protective colloids have a concentration of at least 0.1 wt % (based on the weight of the solids). However, it is preferred that the amount of low molecular weight polyols, such as carbohydrates and mono- and disaccharides have a concentration of at least 5 wt % (based on the weight of the solids). On the other end, high amounts of stabilizer may create even more stable dispersions, which might, however, not be required for a certain application, and which might reduce the effective amount of novolacs in the dispersion, thusly increase the overall costs. Thus, the level of 55 weight % of the polyol (based on total base of the continuous phase—i.e. excluding the novolac) is considered a typical practical upper limit level. Optionally, and for certain applications preferably, the polyol can be a mixture of two or more components, which also may exhibit different stabilizing mechanisms.

As mentioned above, the relative density of the continuous phase to the density of the novolac resin is a factor which affects the stability of die dispersion. The continuous phase (prior to addition of novolac particles or after separation from these particles) preferably exhibits densities of more than 1 g/cm$^3$, more preferably more than 1.05 g/cm$^3$. Below in Table 3, is a list of densities of aqueous solutions containing varying amounts or glucose, sugar solution and maltodextrin.

TABLE 3

| Concentration [Wt %] | Density Glucose syrup solution | Density sugar solution | Density Maltodextrin solution |
| --- | --- | --- | --- |
| 4 | 1.013 | 1.016 | 1.015 |
| 10 | 1.032 | 1.038 | 1.036 |
| 15 | 1.052 | 1.059 | 1.055 |
| 20 | 1.070 | 1.081 | 1.071 |
| 25 | 1.088 | 1.104 | 1.092 |
| 30 | 1.107 | 1.127 | 1.111 |

TABLE 3-continued

| Concentration [Wt %] | Density Glucose syrup solution | Density sugar solution | Density Maltodextrin solution |
| --- | --- | --- | --- |
| 35 | 1.126 | 1.151 | 1.148 |
| 40 | 1.149 | 1.177 | 1.173 |
| 45 | 1.167 | 1.203 | 1.177 |
| 50 | 1.188 | 1.230 | |
| 55 | 1.209 | 1.258 | |
| 60 | 1.231 | 1.287 | |
| 63 | 1.251 | | |
| 65 | 1.259 | | |
| 70 | 1.279 | | |

As mentioned above, the viscosity of the continuous phase is a factor which affects the stability of the dispersion and at a minimum can serve to slow the settling of the dispersed discontinuous solid phase with increased viscosity. Preferably, the continuous phase (prior to addition of novolac particles or after separation from these particles) exhibits a viscosity determined according to DIN 53211 (DIN Cup method, using 4 mm diameter hole, as described herein below) of at least 10 see, more preferably at least 20 sec.

Another way of measuring viscosity is by the Rolling Ball Method (also known as "Hoppler viscosimetry," as described herein below). As shown in the following Table 4, the viscosity will typically increase with increased polyol, however, the overall viscosity of a solution containing more than one type of polyol can display synergism.

TABLE 4

Viscosity of water with added sugar and/or waxy corn starch @ 25° C.

| Polyol | Content (wt %) | Viscosity (mPas) |
| --- | --- | --- |
| None (pure water) | | 1.07 |
| sugar | 15 | 1.49 |
| | 30 | 2.82 |
| | 55 | 22 |
| waxy corn starch | 2 | 19.2 |
| | 4 | 505 |
| | 6 | 2907 |
| Sugar and waxy corn starch | 27.5 and 2 | 51.8 |

Further Additives

In an embodiment, the inventive dispersion consists of polyol(s), water, novolac resin particles and impurities. However, in an embodiment, the inventive dispersion comprises other additives which do not reduce the stability of the dispersion to a point which makes the dispersion impractical for its intended use. These additives include formaldehyde scavengers (such as free phenol at preferably less than 5 wt % based on the weight of the novolac resin), acids (such as oxalic acid, p-toluenesulfonic acid monohydrate, and salicylic acid), pigments, fillers, novolac hardeners (such as hexamethylene tetramine) and the like, in amounts well known to those skilled in the art.

Process of Preparing Dispersions

An aspect of the present invention is a process for preparing the aqueous composition comprising novolac resin particles having individual particles with a size greater than about 50 µm (which is explained in detail above) and exhibiting a dropping point temperature of more than 127° C., said process comprising the steps of: mixing at least one polyol with water and novolac particles in any order. In the event that the at least one polyol is of the type that acts like a protective colloid (such as starches with high amylopectin content), it is preferred to first mix the at least one polyol with water, optionally heating the mixture, and then adding said novolac particles to the mixture. In contrast, if the at least one polyol is of the type that acts as a density modifier (such as monosaccharides), the at least one polyol can be added to water or to a mixture of water and the novolac resin particles. Further, it is preferred that when the novolac resin particles are first combined with water, the at least one polyol is added shortly thereafter (i.e., the mixture is "freshly made") to avoid significant swelling/gelling of the novolac resin particles.

The process can be entirely performed at temperatures of less than 30° C., however, if heating is used to facilitate mixing/solubilization, the mixture can be heated up to 100° C., preferably 90-100° C. Also, it is preferred to keep the temperature well enough below the melting point of the novolac resin, so that a stable dispersion can be obtained without die novolac combining.

Commercially available novolac resins can be used or the novolac resins can be made according to known methods. The method of forming the particles is not particularly limited, and includes grinding of the resins.

Application Of Stable Dispersions Of Novolacs To Substrates

Novolacs can be applied as an aqeous dispersion with low viscosity in various coatings and adhesive applications. For example, as binders for fiberglass, insulation products, agricultural/horticultural materials, lignocellulosic materials (paper and wood), etc.

For application as a thermoplastic binder in low density fiber boards, a dispersion was formed by mixing 20.62% sucrose, 1.5% waxy corn starch, 52.88% water and 25% ground novolac particles having a dropping point of 135° C. and an average particle size of about 30 μm with a particle size distribution of from about 0.9 μm to about 100 μm. The solid content of the dispersion (determined as described herein below) was 47.12% and the viscosity was determined to 75 mPas (Cone/Plate-Viscosity). The dispersion is stable for at least 30 days at ambient conditions. It exhibits a pH of between 5 and 7, and is essentially free of phenol and formaldehyde (<0.1%). As the novolac was an essentially uncured resin, it could function as a scavenger for formaldehyde after low density boards have been formed using such a dispersion.

For coating applications, the stable dispersion may be applied to a surface, such as metal, glass, and paper, and the water of the dispersion may be dried off with or without vacuum and suitable temperatures. Afterwards or at the same time the coating has to be treated with temperatures which are preferably at least the melting point of the novolac resin, more preferably more than the melting point of the resin, thusly forming a novolac film.

Similarly, a stable dispersion may be applied to fibrous structures such as nonwovens or fiberglass or mineral wool materials at a nonvolatile concentration of at least 5% and the water may be dried off under conditions described in the previous paragraph, such that the novolac binder concentrates thusly forming binder points.

EXAMPLES

The novolac resins used in the Examples have properties shown in the following Table 5:

TABLE 5

| Novolac | Prefere 888766R | EXP 5E8851 | Prefere 824118D | Prefere 824440X | Prefere 824441X |
|---|---|---|---|---|---|
| Dropping point | 136° C. | 134.2° C. | 142.3° C. | 133.1° C. | 117.8° C. |
| Free phenol | 0.32% | 0.15% | 0.30% | 0.29% | 0.3% |
| grinding | Production line Condux-mill | Production line Condux-mill | Pilot line Condux-mill | Lab Ball mill | Pilot line Condux-mill |
| Particle size distribution | 0.9-122 μm | 0.9-102 μm | 0.9-146 μm | 0.9-294 μm | 0.9-122 μm |
| Average of particle size | 20 μm | 21 μm | 23 μm | 52 μm | 20 μm |
| Wt-% of particles >50 μm | 11.67% | 9.2% | 13.22% | 52.02% | 5.77% |
| Wt-% of particles <32 μm | 69.89% | 70.46% | 67.17% | 38.25% | 77.32% |
| Wt-% of particles <63 μm | 94.35% | 96.34% | 92.94% | 53.31% | 97.73% |
| Wt-% of particles <90 μm | 99.05% | 99.68% | 98.41% | 62.47% | 99.74% |
| Used in example | Inv. Examples 1, 2, 12, 15 and 16 and Comp. Example 2 | Inv. Examples 3, 9, 10, 11 and 17 | Inv. Examples 4-8 and 14 and Comp. Example 1 | Inv. Example 13 | Comp. Example 3 |

Inventive Example 1

60 g of waxy corn starch (Meritena 300, Tate&Lyle) is added to 1440 g water under stirring. The mixture is heated to 80-90° C. under stirring and kept for 30 minutes at this temperature. The mixture is cooled below 20° C. and then 500 g of finely ground novolac (Prefere 88 8766R of Dynea Erkner GmbH, see Table 5) is added under stirring. The dispersion is homogenized and stirred for additional 10 minutes. The viscosity (Hoppler, 20° C., DIN 53015) was 521 mPas. The characteristics (nonvolatile percentage and stability data) are given below in Table 6.

Inventive Example 2

10 g of waxy corn starch (C*Gel 04201, Cargill) is added to 480 g water under stirring. The mixture is heated to 80-90° C. under stirring and kept for 30 minutes at this temperature. The mixture is cooled to 15-20° C. and then 480 g of finely ground novolac (Prefere 88 8766R, Dynea Erkner GmbH, see Table 5) is added under stirring. The dispersion is homogenized. The viscosity was (Rheostress 25° C.) 261 mPas. The nonvolatile percentage and the stability data are given below in Table 6.

It was also found that if Example 2 is essentially repeated except that 1% of hexamethylene tetraamine (novolac hardener) is added, the stability of the dispersion is not dramatically influenced.

Figure 1:
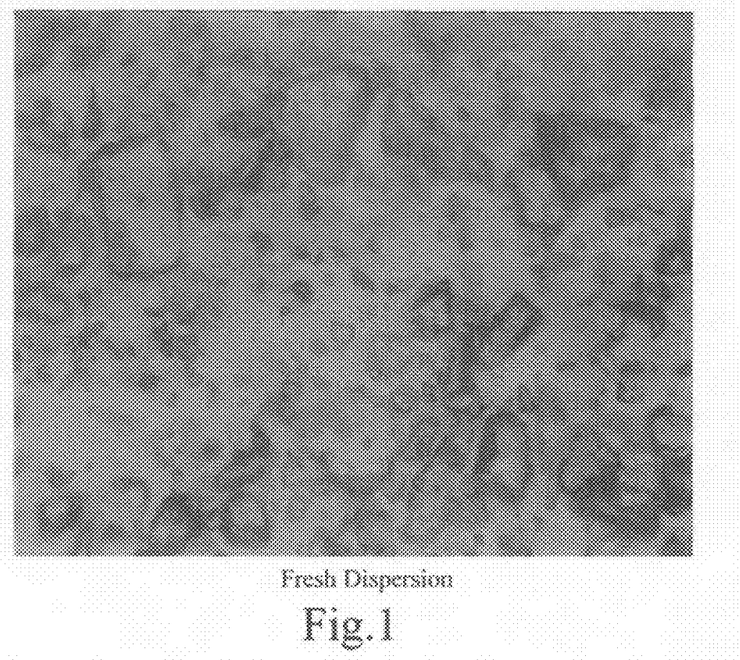
FIG. 1 is a dispersion of novolac resin which is freshly made as described in Inventive Example 2 below.
Figure 2:
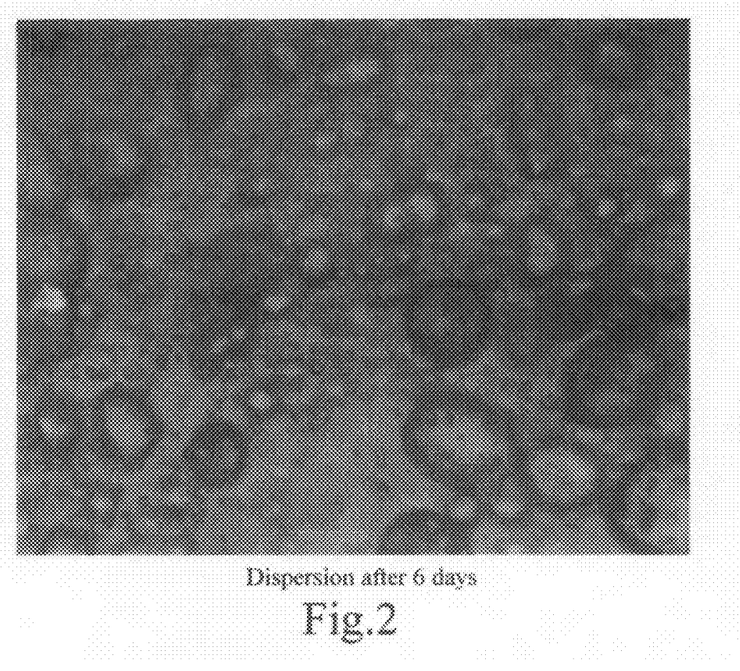
FIG. 2 is essentially the same dispersion as in FIG. 1 except that the dispersion has been aged 6 days.

FIG. 1 is a dispersion of Example 2 which is freshly made and FIG. 2 is essentially the same dispersion as in FIG. 1 except that the dispersion has been aged 6 days.

Inventive Example 3

420 kg water were mixed with 5 kg waxy corn starch (C*Gel 04201, Cargill) and heated to 85° C. At this temperature the mixture was kept for 15 minutes. Afterwards 325 kg sugar was added and when the sugar was dissolved completely the batch was cooled down to 15-23° C. 250 kg of ground novolac (EXP 5E8851, Dynea Erkner GmbH) which is characterized according to Table 5 was stepwise added and homogenized by stirring for 1 hour at 22° C. The nonvolatile percentage and the stability data are given below in Table 6.

Inventive Example 4

A mixture consisting of 1.5 wt-% waxy corn starch (C*Gel 04201, Cargill) and 52.88 wt-% water is heated to 98° C. for 10 minutes. Afterwards 20.62 wt-% sugar is added to the hot mixture. Under stirring the sugar is allowed to dissolve. When the mixture is cooled down to 21-23° C., 25 wt-% ground novolac (Prefere 82 4118D, Dynea Oy, see Table 5) is stirred under the liquid phase until the whole mixture is homogeneous. The nonvolatile percentage and the stability data are given below in Table 6.

Inventive Example 5

Into 1669 g water, 7.02 g waxy corn starch (C*Gel 04201, Cargill) is added and heated to 82-85° C. for 15 minutes. 1833.98 g sugar are dissolved in the mixture while cooling down to 20-25° C. Afterwards 1170 g, ground novolac (Prefere 82 4118D, Dynea Oy, see Table 5) is added. The dispersion is stirred until it is homogeneous. The nonvolatile percentage and the stability data are given below in Table 6.

Inventive Example 6

0.105 kg waxy corn starch starch (C*Gel 04201, Cargill) was mixed with 2.439 kg water and boiled for 5 minutes. 0.965 kg sugar is added and the mixture is cooled down to 21-24° C. 1.170 kg ground novolac (Prefere 82 4118D, Dynea Oy, see Table 5) is stirred into the liquid phase until a homogeneous dispersion is formed. The nonvolatile percentage and the stability data are given below in Table 6.

Inventive Example 7

A starch solution in water is prepared by dissolving 140.4 g waxy corn starch (C*Gel 04201, Cargill) in 1614.6 g water and heating to 85-95° C. The solution is held at this temperature for 20 minutes and cooled before use to 18-23° C.

Separately, a sugar solution is prepared by dissolving 965.25 g sugar in 789.75 g of water at a temperature of 50-55° C. The solution is cooled down to 18-23° C. before use.

1.755 kg of the starch solution in water (8 wt-%) is mixed with 1.755 kg of the sugar solution (55 wt-%) at 25° C. To that mixture 1.170 kg of ground novolac (Prefere 82 4118D, Dynea Oy, see Table 5 is added and stirred until the dispersion is homogeneous. The nonvolatile percentage and the stability data are given below in Table 6.

Inventive Example 8

41.25 wt-% sugars are dissolved in 33.75 wt-% water at 60-63° C. After cooling down to 18-22° C. 25 wt-% novolac (Prefere 82 4118D, Dynea Oy, see Table 5) is stirred in until receiving a homogeneous dispersion. The nonvolatile percentage and the stability data are given below in Table 6.

Inventive Example 9

Into a solution of low molecular wheat protein containing natural compounds in water containing a solids content of 40%, novolac (EXP 5E8851, Dynea Erkner GmbH, see Table 5) was added, in an amount to give a concentration of 25 wt % of the novolac based on the weight of the solution, at 23° C. and stirred until complete homogenization. The nonvolatile percentage and the stability data are given below in Table 6.

Inventive Example 10

Into 140 g of a solution of low molecular wheat protein containing natural compounds in water containing a solids content of 49.5%, 60 g of ground novolac (EXP 5E8851, see Example 3 and Table 5) was added to give a concentration of 30 wt % of the novolac based on the weight of the solution, at 23° C. and stirred until complete homogenization. The nonvolatile percentage and the stability data are given below in Table 6.

Inventive Example 11

53.34 g ground novolac (EXP 5E8851, Dynea Erkner GmbH, see Example 3 and Table 5) is stirred into a mixture consisting of 80 g of a 55 wt % sugar solution and 80 g of a 4 wt % mixture of wheat flour (type 405) in water at 23-25° C. until the dispersion is homogeneous. The nonvolatile percentage and the stability data are given below in Table 6.

Inventive Example 12

94.5 g of C*Sweet 01407 (Cargill) are well mixed with 55.5 g water. At 24-25° C., 49.95 g novolac (Prefere 888766R, Dynea Erkner GmbH, see Example 1 and Table 5) is stirred into the liquid phase until the dispersion becomes homogeneous. The nonvolatile percentage and the stability data are given below in Table 6.

Inventive Example 13

60 g novolac (Prefere 82 4440X, Dynea Oy, see Table 5), ground in the ball mill, are stirred into a solution of 73.5 g sugar in 66.5 g water, which was cooled to 20-23° C. before use. The nonvolatile percentage and the stability data are given below in Table 6.

Inventive Example 14

Waxy corn starch (Meritena 300, Tate&Lyle) is added to water to give 4 wt % waxy corn starch-solution. The mixture is heated to 95° C. and kept at this temperature for 10 minutes and then is cooled to 18-22° C. Separately a 55 wt % sugar solution is prepared by combining sugar and water. 35.11 g of the 4 wt % waxy corn starch-solution is combined with 35.11 g of the 55 wt % sugar solution. Under stirring 46.80 g ground novolac (Prefere 82 4118D, Dynea Oy, see Table 5) is added at 18-20° C. The dispersion is stirred until it is homogeneous. The nonvolatile percentage and the stability data are given below in Table 6.

Inventive Example 15

0.3 g waxy corn starch (C*Gel 04201, Cargill) and 0.3 g maltodextrine (C*Dry MD 01958, Cerestar) are mixed into 14.4 g water and are heated to 95° C. for 15 minutes. The mixture is cooled down to 20° C., and then 5 g ground novolac (Prefere 888766R, Dynea Erkner GmbH, see Table 5) is added and the dispersion is stirred until it is homogeneous. The nonvolatile percentage and the stability data are given below in Table 6.

Inventive Example 16

0.45 g cationic maize dextrine (C*Film MS 05978, Cerestar) is mixed with 14.4 g water and 0.15 g waxy corn starch (C*Gel 04201, Cargill). After heating to 85-92° C. for 20 minutes, the mixture is cooled down to 17-23° C. Afterwards 5 g of a ground novolac (Prefere 888766R, Dynea Erkner GmbH, see Table 5) is stirred into the fluid phase until the dispersion is homogeneous. The nonvolatile percentage and the stability data are given below in Table 6.

Inventive Example 17

60 g of solution containing 1% waxy corn starch (Meritena 300, Tate&Lyle) was prepared by heating to 100° C. and keeping so for 5 minutes. After cooling to 16-20° C., 40 g ground novolac (EXP 5E8851, Dynea Erkner GmbH, see example 1 and Table 5) is stirred into the starch solution until the dispersion becomes homogeneous. The dispersion keeps stable for at most 14 hours.

The following Comparative Examples 1 and 2 are nonpreferred embodiments of the invention.

Comparative Example 1

A solution of low molecular wheat protein containing natural compounds in water with solid content of 25% is neutralised using NaOH (1N). At 22-25° C. to 50 g of this solution 12.5 g ground novolac (Prefere 82 4118D, Dynea Oy, see Example 4 and Table 5) is added. This dispersion keeps stable only for several hours. Sedimentation can be observed after 6 hours of storage at ambient conditions.

Comparative Example 2

3.33 g ground novolac (Prefere 888766R, Dynea Erkner GmbH, see Example 1 and Table 5) is stirred into 10 g of a 35 wt % maltodextrine (C*Dry MD 01958, Cerestar) solution (which has been pretreated at 90° C. for 10 min) at temperature of 20-24° C. until the dispersion becomes homogeneous. The nonvolatile percentage and the stability data are given below in Table 6.

The following Comparative Example 3 is outside the invention.

Comparative Example 3

Essentially the same procedure as described above for Inventive Example 4 is repeated except that the novolac resin Prefere 82 4118D is replaced with a novolac resin Prefere 82 4441X (Dynea Oy) having a low dropping point.

Specifically, waxy corn starch (Meritena 300, Tate&Lyle) is added to water to give 4 wt % waxy corn starch-solution. The mixture is heated to 95° C. and kept at this temperature for 10 minutes and then is cooled to 18-22° C. Separately a 55 wt % sugar solution is prepared by combining sugar and water. 35.11 g of the 4 wt % waxy corn starch-solution is combined with 35.11 g of the 55 wt % sugar solution. Under stirring 23.41 g ground novolac (Prefere 82 444.1X, Dynea Oy, dropping point 117.8° C., see Table 1) is added at 18-20° C. The mixture is stirred. The novolac coagulates and no dispersion could be obtained.

TABLE 6

Composition Details of Examples

| Example | Sugar [%] | waxy corn starch [%] | Water [%] | Novolac [%] | Other [%] | Nonvolatiles [%] | Stability |
|---|---|---|---|---|---|---|---|
| Inventive 1 | — | 3.0 | 72.0 | 25 | | 27.6% | at least 3 weeks |
| Inventive 2 | — | 1 | 49 | 49 | | 50% | at most 3 weeks |
| Inventive 3 | 34.3 | 0.5 | 40.2 | 25 | | 58.5% | at least 6 months |
| Inventive 4 | 20.62 | 1.50 | 52.88 | 25 | | 47.6% | at least 6 months |
| Inventive 5 | 39.18 | 0.15 | 35.67 | 25 | | 64.6% | at least 3 months |
| Inventive 6 | 20.62 | 2.25 | 52.13 | 25 | | 49.0% | at least 6 months |
| Inventive 7 | 20.62 | 3.0 | 51.38 | 25 | | 47.7% | at least 6 months |
| Inventive 8 | 41.25 | — | 33.75 | 25 | | 68.4% | at least 3 months |
| Inventive 9 | | | 45 | 25 | Wheat compounds [30] | 54.9% | after 1 day water layer on the top |
| Inventive 10 | | | 35.35 | 30 | Wheat compounds [34.65] | 64.7% | at most 3 weeks |

TABLE 6-continued

Composition Details of Examples

| Example | Sugar [%] | waxy corn starch [%] | Water [%] | Novolac [%] | Other [%] | Nonvolatiles [%] | Stability |
|---|---|---|---|---|---|---|---|
| Inventive 11 | 20.62 | — | 52.88 | 25 | Wheat compounds [1.50] | 47.2% | after 2 day water layer on the top |
| Inventive 12 | — | — | 27.76 | 24.98 | Glucose syrup [47.26] | 64.2% | after 3 day water layer on the bottom |
| Inventive 13 | 36.75 | — | 33.25 | 30 | | 67.7% | after 2 day water layer on the bottom |
| Inventive 14 | 16.5 | 1.2 | 42.3 | 40 | | 57.8% | at most 2 weeks |
| Inventive 15 | — | 1.5 | 72 | 25 | Maltodextrine [1.5] | — | at most 1 day |
| Inventive 16 | — | 2.25 | 72 | 25 | Cationic maize dextrin [0.75] | — | at most 5 days |
| Inventive 17 | — | 0.6 | 59.4 | 40 | | 40.1% | at most 14 hours |
| Comparative 1 | — | — | 60 | 20 | Wheat compounds [20] | 39.8% | at most 1 hour |
| Comparative 2 | — | — | 48.76 | 24.98 | Maltodextrine [26.25] | — | at most 6 hours |
| Comparative 3 | 20.62 | 1.5 | 52.88 | 25 | | — | no dispersion obtained |

The fragments of the ground novolac are irregular solid particles. Surprisingly, after being dispersed in the starch solution, it seems as if they are encapsulated by the waxy starch to form spherical shapes and thus, a neat dispersion is obtained. (See pictures 1 and 2)

This dispersion is stable for a long time and combines the advantages of a novolac with the application advantages of using water as a solvent.

The description of the methods of forming the novolac resins and the description of the novolac resins and the novolac resin compositions as described in the references cited above are herein incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Test Methods

All test methods are—unless otherwise specified operated under ambient conditions.

Particle Size Distribution

The particle size of non-dispersed essentially dry novolac particles can suitably be performed by a laser diffraction analysis, such as by using an equipment of Sympatec (sensor: Helos; dispergator for dry substances: Rodos). The measurement range is determined using R4 ((0.5 (0.9)-350 µm). The measurement was carried out with pre pressure of 1.5 bar and trigger conditions of 1.5% optical density. The measurement results are discussed in Table 5.

Within the present context, the particle size reefers to the primary particles. It should be noted, that in both in the case of dry as well as wet analysis, and several or many particles may form particle cluster or aggregates. These should be disregarded in the measurements.

TABLE 7

Unless stated otherwise, the following tests were used:

| Method | Standard reference | Comments/specific test parameter |
|---|---|---|
| Flow distance method | DIN EN ISO 8619 | 3 g novolac + 0.3 g hexamethylenetetramine, 125° C., 3 min 0°, 30 min 60° |
| Dropping point FP 83 Mettler Toledo | DIN ISO 2176 | according to user's manual of Mettler Toledo FP900 |
| Content of free Phenol | DIN EN IS0 8974 | Gas chromatography |
| Water content of powdered novolacs | DIN 53715 | method according to Karl Fischer |

TABLE 7-continued

Unless stated otherwise, the following tests were used:

| Method | Standard reference | Comments/specific test parameter |
|---|---|---|
| Determination of $M_w$ | | GPC equipment Polymer Labratories, Software PL GPC; conditions: coloumn set 3 × PLgel 300 × 7.5 mm; 5 µm; 50, 100, 1000 A; solvent: THF, 35° C., Flow rate 0, 6, detector: HP MWD 1050, 280 nm, Standard: Polystyrene |
| Contact angle | | Equipment "Krüss"G40, water contact angle |
| Liquid density measurement | DIN EN ISO 3675 | Hydrometer, 20° C. |
| Viscosity for stationary phase (Höppler) | DIN EN ISO 12058-1 | Rolling ball viscometer 20° C. |
| Viscosity of dispersion | DIN 53211 | Flow time by the DIN cup, 20° C. |
| Viscosity (Cone/Plate) | DIN EN ISO 3219 | Equipment "Thermo Fisher Scientific, RS1", Software RheoWin, conditions: cone/plate; 105 µm gap; sensor: C35/2° T; rotation, shear rate: 2000/sec, 25° C. |
| Solid content | DIN EN ISO 3251 | 3 g; 1 hr; 135° C. |
| Particle Size | | Laser diffraction analysis using a Sympatec (Helos, Rodos) |

We claim:

1. An aqueous composition comprising a particulate novolac resin and a polyol, wherein >50% of the number of total particles of novolac resin have a particle size of >15 µm and >5% of the number of total particles of novolac resin have a particle size of >50 µm, wherein the particulate novolac resin has a dropping point temperature of >127° C., and a polyol, wherein the aqueous composition is essentially free of organic solvent, and
wherein the novolac particles have a melt temperature of >100°.

2. The aqueous composition according to claim 1, which is in the form of a stable dispersion.

3. The aqueous composition according to claim 2, wherein the novolac particles have a flow distance of <45 mm and a weight average molecular weight ($M_w$) of >3,800 daltons.

4. The aqueous composition according to claim 1, wherein the polyol is a carbohydrate.

5. The aqueous composition according to claim 4, wherein the carbohydrate is a waxy starch.

6. The aqueous composition according to claim 4, wherein the carbohydrate is a low molecular weight carbohydrate.

7. The aqueous composition according to claim 2, wherein the polyol is in a concentration of 0.1-55 wt % based on the weight of the aqueous composition excluding the weight of the novolac.

8. The aqueous composition according to claim 2, wherein the dispersion has a continuous phase having a density of >1.05 g/cm$^3$ and a DIN Cup Viscosity (using 4 mm diameter hole) of at least 10 sec.

9. The aqueous composition according to claim 1, wherein the polyol is a carbohydrate and the aqueous composition further comprises protein.

10. A method for preparing a aqueous composition of particulate novolac resin comprising:
combining a polyol, novolac resin particles and water, in any order,
wherein >50% of the number of total particles of novolac resin have a particle size of >15 µm and >5% of the number of total particles of novolac resin have a particle size of >50 µm, wherein the particulate novolac resin has a dropping point temperature of >127° C., and wherein the aqueous composition is essentially free of organic solvent, and
wherein the novolac particles have a melt temperature of >100° C.

11. The method according to claim 10, wherein the aqueous composition is a stable dispersion of the particulate novolac resin.

12. The method according to claim 10, wherein the polyol is combined with water until the polyol is thoroughly mixed in the water and then adding the novolac resin particles to the mixture.

13. The method according to claim 12, wherein the polyol is combined with water and the mixture is heated to at least 50° C.

14. The method according to claim 13, wherein the mixture is cooled to room temperature prior to adding the novolac resin particles to the mixture.

15. The method according to claim 10, wherein the novolac particles have a flow distance of <45 mm and a weight average molecular weight ($M_w$) of >3,800 daltons.

16. The method according to claim 10, wherein the polyol is a carbohydrate.

17. The method according to claim 10, wherein the polyol which is combined with novolac resin particles and water is added as a starch-containing product comprising protein.

18. The method according to claim 16, wherein the carbohydrate is a waxy starch.

19. The method according to claim 16, wherein the carbohydrate is a low molecular weight carbohydrate.

20. The method according to claim 10, wherein the polyol is in a concentration of 0.1-55 wt % based on the weight of the aqueous composition excluding the weight of the novolac.

21. A film or coating formed by applying the aqueous composition according to claim 1 to a substrate and removing the aqueous solvent.

22. A fiberglass product prepared by applying the aqueous composition according to claim 1 to fiberglass and removing the aqueous solvent.

23. An agricultural/horticultural product prepared by applying the aqueous composition according to claim 1 to nonwoven fibers and removing the aqueous solvent.

24. A lignocellulosic product prepared by applying the aqueous composition according to claim 1 to lignocellulosic material and removing the aqueous solvent.

25. The lignocellulosic product according to claim 24, which is a composite board, plywood, parquet, laminated veneer lumber (LVL), laminated flooring, door, wood for door frame and paper.

* * * * *